(12) United States Patent
Nakamura et al.

(10) Patent No.: US 7,988,474 B2
(45) Date of Patent: Aug. 2, 2011

(54) ELECTRONIC APPARATUS AND FLAT CABLE

(75) Inventors: Yutaka Nakamura, Kawasaki (JP); Tomoyuki Nagamine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 106 days.

(21) Appl. No.: 12/474,625

(22) Filed: May 29, 2009

(65) Prior Publication Data

US 2010/0055950 A1 Mar. 4, 2010

(30) Foreign Application Priority Data

Aug. 27, 2008 (JP) ................................ 2008-217580

(51) Int. Cl.
*H01R 35/02* (2006.01)
(52) U.S. Cl. ...................................................... 439/164
(58) Field of Classification Search .................. 439/164, 439/15, 165; 242/396, 407, 388; 361/755
See application file for complete search history.

(56) References Cited

U.S. PATENT DOCUMENTS

| | | | |
|---|---|---|---|
| 5,141,446 A | 8/1992 | Ozouf et al. | |
| 5,762,508 A | 6/1998 | Tanaka et al. | |
| 2004/0209505 A1 * | 10/2004 | Wade et al. | 439/164 |

FOREIGN PATENT DOCUMENTS

| | | |
|---|---|---|
| JP | 04-233298 A | 8/1992 |
| JP | 06-311216 A | 11/1994 |
| JP | 09-148026 A | 6/1997 |
| JP | 2006-173406 A | 6/2006 |
| JP | 2008-078471 A | 4/2008 |

* cited by examiner

*Primary Examiner* — Alexander Gilman
(74) *Attorney, Agent, or Firm* — Westerman, Hattori, Daniels & Adrian, LLP

(57) ABSTRACT

An electronic apparatus includes: first and second electronic units opposed to each other and connected to relatively rotate in a given plane; and a flat cable electrically connecting the first and second electronic units. The flat cable includes: first and second extending portions respectively connected to the first and second electronic units sides, and each having a surface extending along the given plane; and a bent portion having a bent surface located between the first and second extending portions, and the bent surface bent to surround a normal line perpendicular to the given plane.

9 Claims, 13 Drawing Sheets

FIG. 3A
FIG. 3B
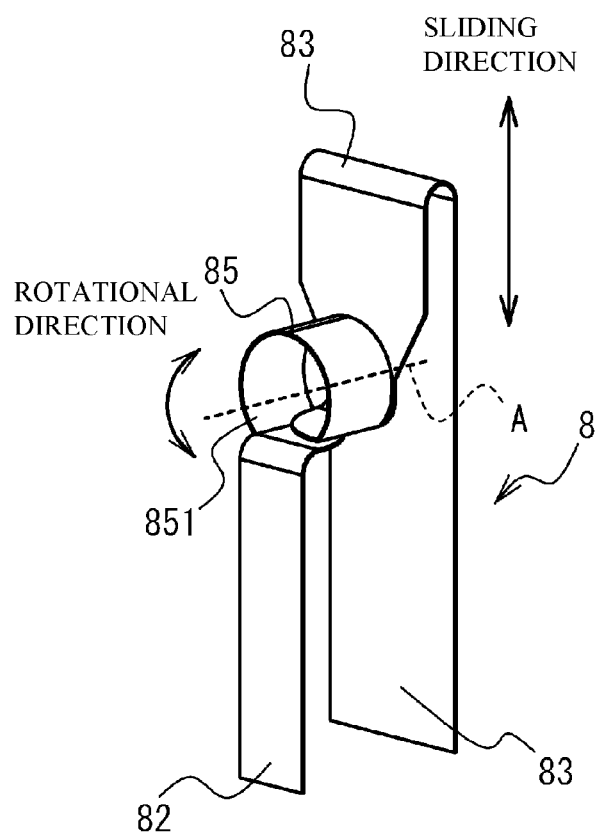
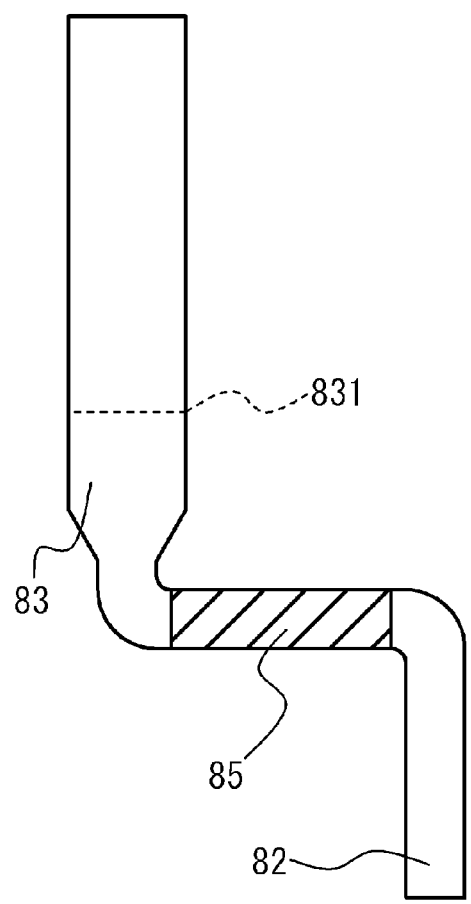

FIG. 6A    FIG. 6B    FIG. 6C
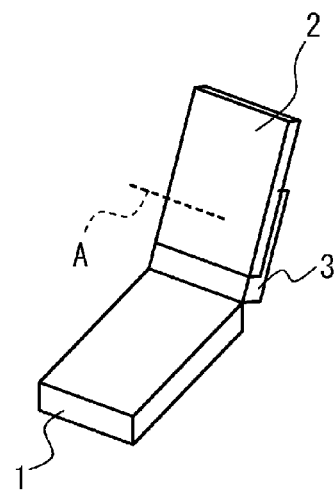
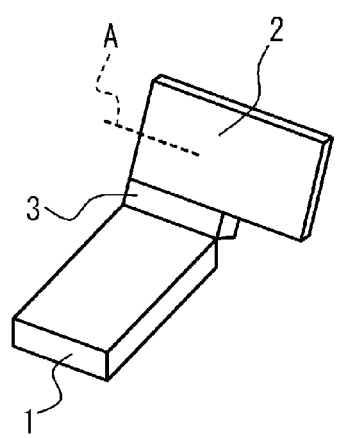
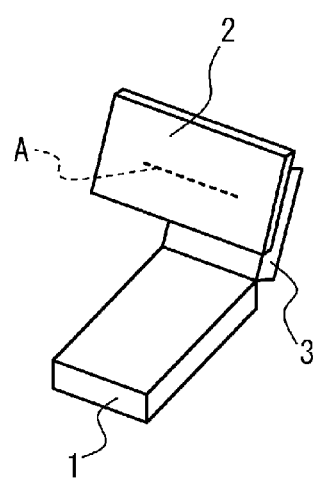
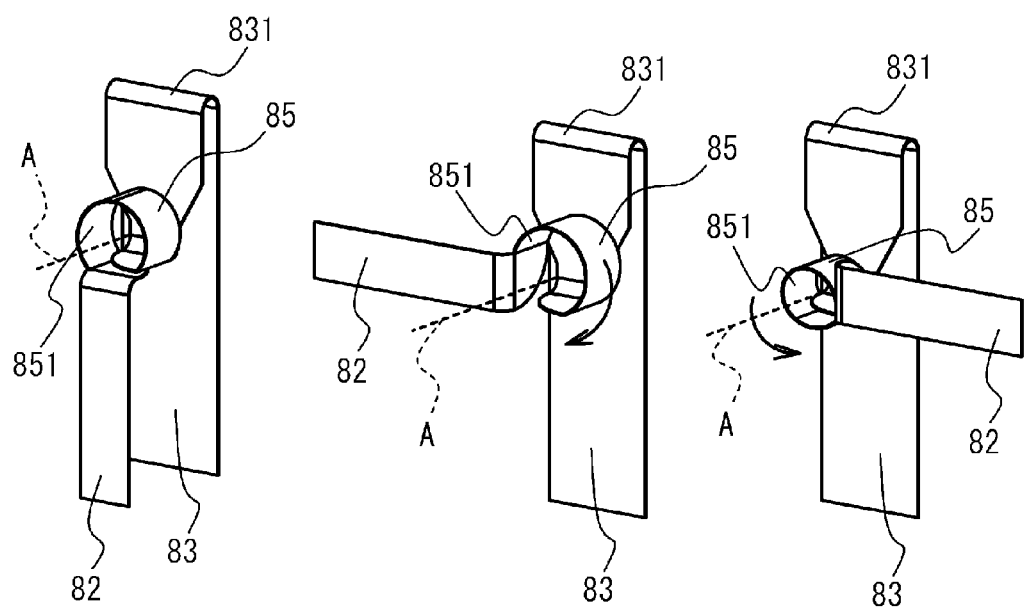

FIG. 11A
FIG. 11B
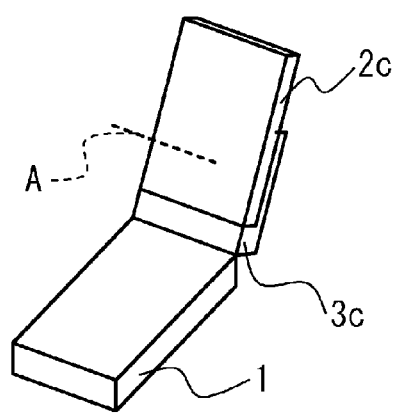
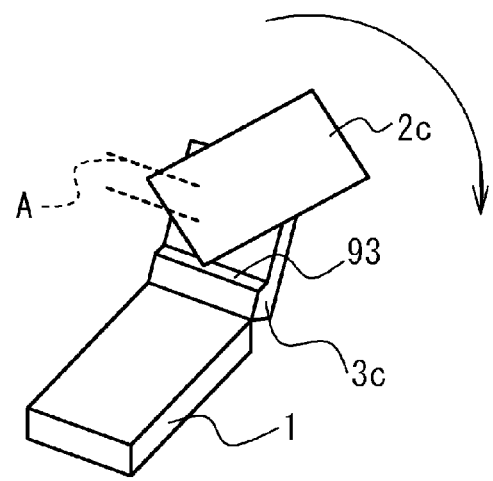
FIG. 11C
FIG. 11D
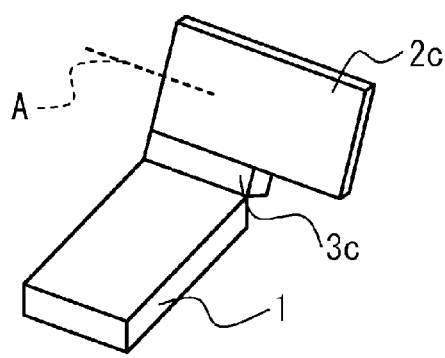
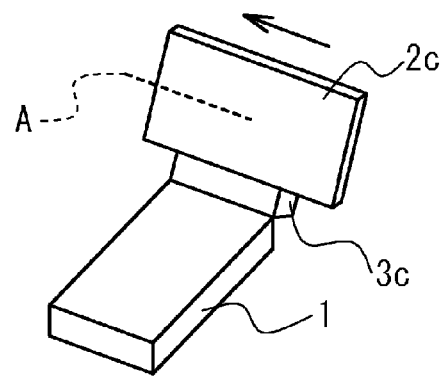

FIG. 13A
FIG. 13B
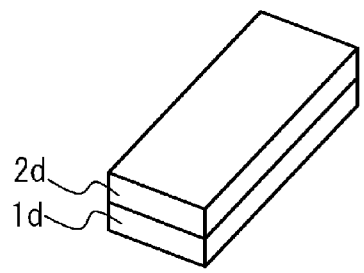
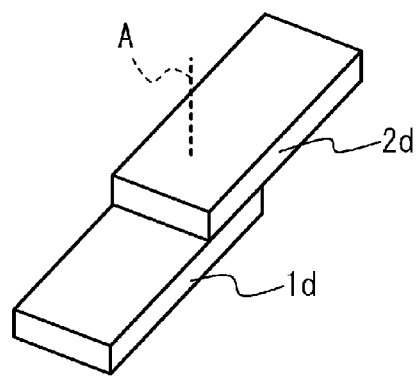
FIG. 13C
FIG. 13D
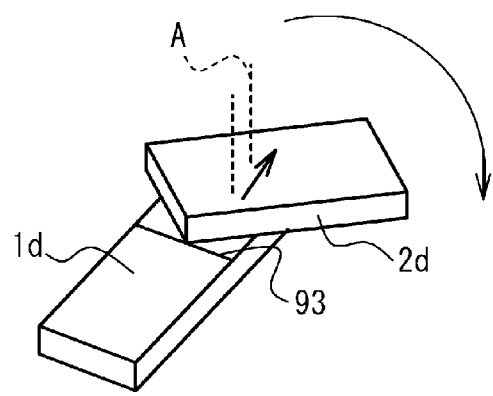
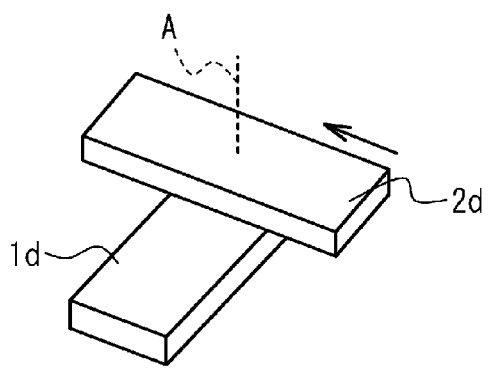

ELECTRONIC APPARATUS AND FLAT CABLE

CROSS-REFERENCE TO RELATED APPLICATION

This application is based upon and claims the benefit of priority of the prior Japanese Patent Application No. 2008-217580, filed on Aug. 27, 2008, the entire contents of which are incorporated herein by reference.

FIELD

The embodiments discussed herein are related to an electronic apparatus and a flat cable.

BACKGROUND

Conventionally, there is known an electronic apparatus, such as a mobile phone, including first and second electronic units being opposite to each other and connected for relative rotation in a given plane. Each of the first and second electronic unites is equipped with a substrate, and both substrates are electrically interconnected by plural cables.

Such cables are bundled between the first and second electronic units, and are housed in a given position. When such an electronic apparatus is assembled, the plural cables have to be bundled and housed in a given space. This degrades the assembling workability of the apparatus.

SUMMARY

According to an aspect of the embodiment, an electronic apparatus including: first and second electronic units opposed to each other and connected to relatively rotate in a given plane; and a flat cable electrically connecting the first and second electronic units, the flat cable including: first and second extending portions respectively connected to the first and second electronic units sides, and each having a surface extending along the given plane; and a bent portion having a bent surface located between the first and second extending portions, and the bent surface bent to surround a normal line perpendicular to the given plane.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIGS. 3A and 3B are explanatory views of a FFC;

FIGS. 6A to 6C are explanatory views of the state of the FFC in association with the rotation of the display portion and the arm portion;

FIGS. 11A to 11D are explanatory views of the rotation of a display portion and an arm portion of a mobile phone according to a fourth embodiment;

FIGS. 13A to 13D are explanatory views of the mobile phone according to a fifth embodiment.

DESCRIPTION OF EMBODIMENTS

A description will be given of embodiments with reference to the accompanying drawings.

First Embodiment

Figure 1:
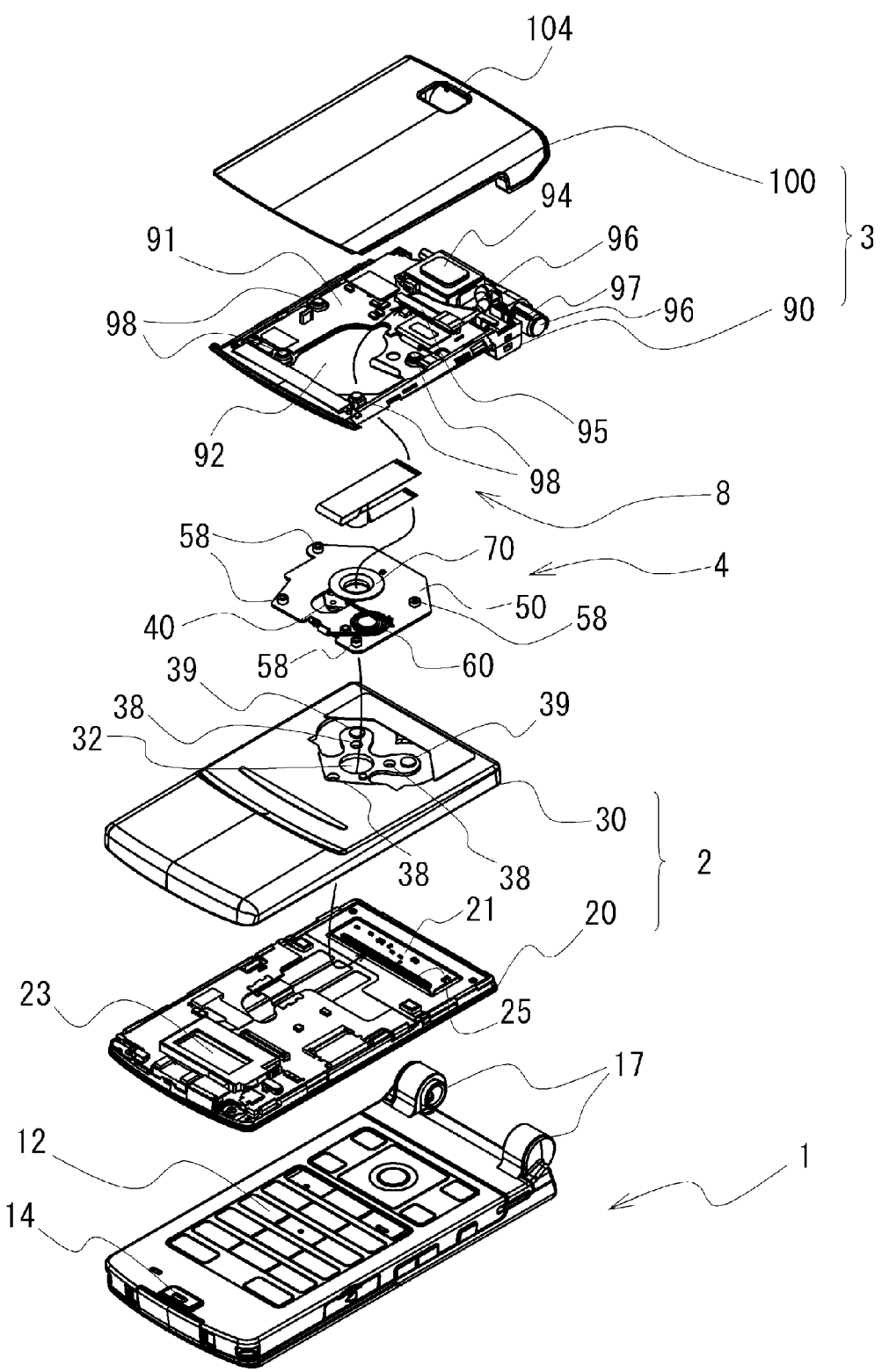
FIG. 1 is an exploded view of a mobile phone according to a first embodiment.

FIG. 1 is an exploded view of a mobile phone (electronic apparatus) according to the first embodiment. The mobile phone includes, a main portion 1, a display portion (first electronic unit) 2, an arm portion (second electronic unit) 3, a connecting mechanism 4, and a FFC (Flexible Flat Cable) 8. Moreover, FIG. 1 is the exploded view where the mobile phone is closed. The display portion 2 includes a front case 20 and a rear case 30. The arm portion 3 includes a front case 90 and a rear case 100. The front cases 20 and 90 and the rear cases 30 and 100 are made of synthetic resins.

An operational portion 12 is provided for a user to operate the main portion 1 and a microphone 14 for collecting user's voice is provided at a front side of the main portion 1. The operational portion 12 includes plural operation keys. The display portion 2 and the arm portion 3 are opposite to each other, and connected to relatively rotate in a given plane. The connecting mechanism 4 connects the display portion 2 with the arm portion 3 for relative rotation. The connecting mechanism 4 is arranged between the display portion 2 and the arm portion 3.

Further, the main portion 1 and the arm portion 3 are connected with each other to be capable of opening and closing. Specifically, a bearing portion 17 formed in the main portion 1 and a bearing portion 97 formed in the front case 90 function as a hinge. The FFC 8 electrically connects the display portion 2 and the arm portion 3. The FFC 8 is constructed with plural electronic signal lines aligned within a band-shape member made of plastic material in the length direction.

The front case 20 is provided with a display, not illustrated, at its surface opposite to a surface at which the operational portion 12 of the main portion 1 is provided. Further, a substrate 21 is installed into the front case 20. The substrate 21 is a printed substrate which has rigidity and is made of a base material, such as a polyimide resin, an epoxy resin, or a glass-epoxy resin, on which wiring is patterned. A connector 25 which is connected with one end of the FFC 8 is mounted on the substrate 21. Therefore, the FFC 8 and the substrate 21 are electrically connected to each other. Further, a speaker 23 which outputs voices of the person who talk with the other person's voice is installed in the front case 20.

The front case 90 is provided with an opening 92 at its central position. Further, a substrate 91 is installed in the front case 90. The substrate 91 is a printed substrate which has rigidity and is made of a base material, such as a polyimide resin, an epoxy resin, or a glass-epoxy resin, on which wiring is patterned. A connector 95 is mounted on the substrate 91. The other end of the FFC 8 is connected to the connector 95 via the opening 92. This ensures the electrical connection of the FFC 8 and the substrate 91. Therefore, the substrates 21 and 91 are electrically connected via the FFC 8. The connector 95 is connected with a cable 96, and the other end of the cable 96 is located within the bearing portion 97. By connecting the bearing portion 97 to the bearing portion 17, a cable located within the main portion 1 and the cable 96 are electrically connected. Therefore, the arm portion 3 and the main portion 1 are electrically connected. Additionally, a camera unit 94, in which an image pickup device (not illustrated) is installed, is mounted on the substrate 91. The camera unit 94 is exposed via an opening 104 of the rear case 100.

One end and the other end of the FFC 8 are respectively connected to the display portion 2 side and the arm portion 3 side through an opening of the connecting mechanism 4, as will be described later, an opening 32 of the rear case 30, and an opening 92 of the front case 90.

Figure 2:
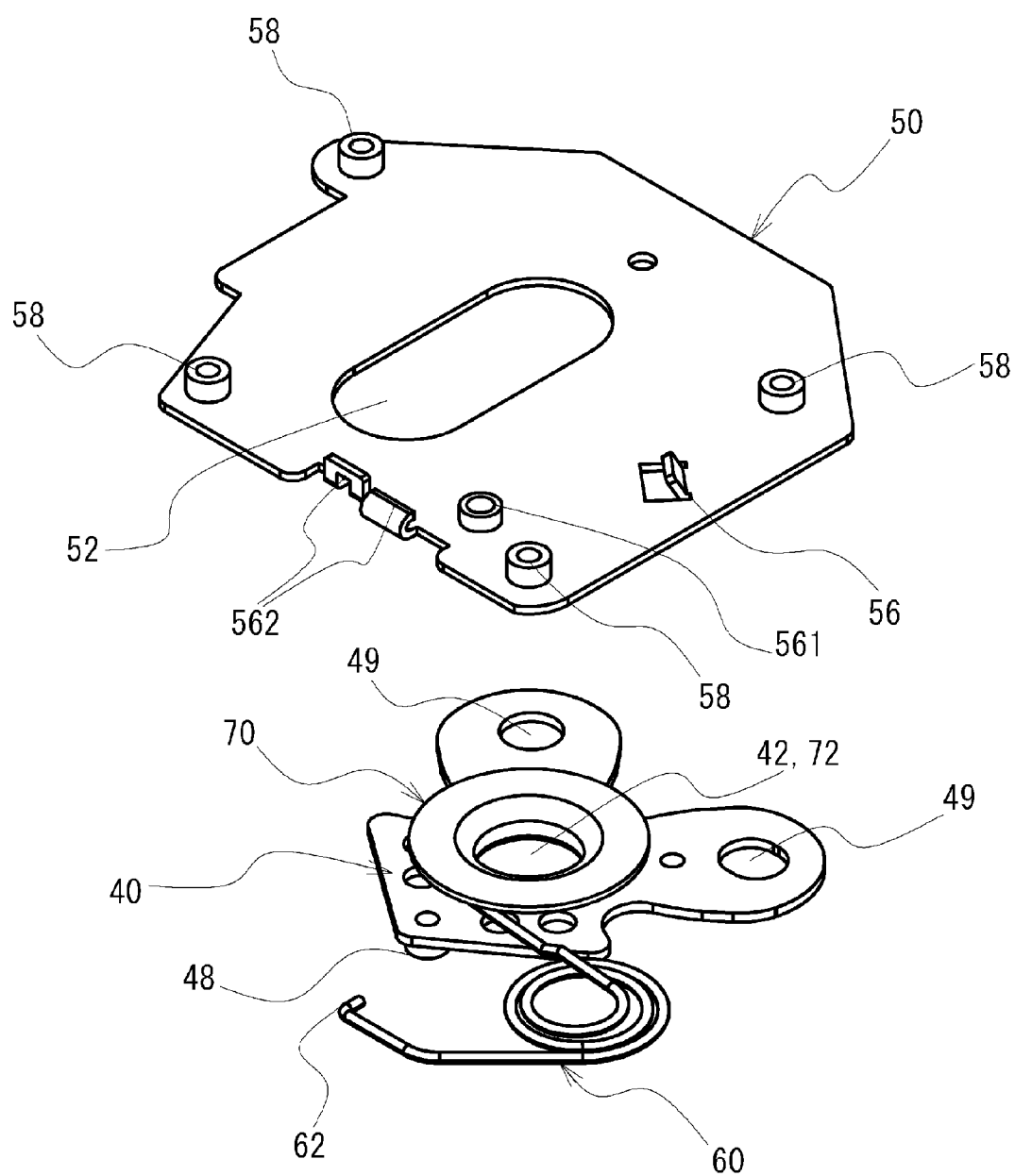
FIG. 2 is an exploded view of a part of a connecting mechanism.

FIG. 2 is an exploded view of a part of the connecting mechanism 4. The connecting mechanism 4 includes a rotary plate (first fixing member) 40, a holding plate (second fixing member) 50, a spring 60 and a ring member 70. The rotary plate 40, the holding member 50, the spring 60, and the ring member 70 are made of metals. The rotary plate 40 and the holding member 50 are formed into plate shapes. The ring member 70 has a ring shape.

The rotary plate 40 is fixed at a rear surface of the rear case 30. Specifically, the rotary plate 40 has plural projection 48, and the projections 48 are fitted into holes 38 formed at the rear surface of the rear case 30. In addition, the rotary plate 40 has plural holes 49, and the holes 49 are fitted onto projections 39 formed at the rear surface of the rear case 30. Thus, the rotary plate 40 is fixed to the rear case 30. Further, an opening 42 is provided at a central portion of the rotary plate 40.

The holding member 50 is fixed at a front surface of the front case 90. The holding member 50 is provided with plural projections 58, and the front case 90 is provided with recess portions 98. By fitting the projections 58 and the recess portions 98 to each other, the holding member 50 is attached to the front case 90. The holding member 50 has an opening 52 at its central portion. The opening 52 is defined as an oblong hole.

The ring member 70 connects the rotary plate 40 and the holding member 50 for relative rotation. Specifically, the ring member 70 is engaged with the openings 52 and 42, as illustrated in FIG. 1. The ring member 70 is engaged with the opening 52 with a certain clearance between the opening 52 and the ring member 70. The rotary plate 40 is capable of slidably rotating relatively to the holding member 50. Further, the openings 42 and 72 are fitted so that they cannot slidably rotate. Accordingly, the rotary plate 40 is capable of rotating with the ring member 70 relative to the holding member 50. Consequently, the relative rotation of the display portion 2 and the arm portion 3 is ensured, as mentioned later.

Moreover, the ring member 70 is slidably engaged with the opening 52 in the length direction of the opening 52 which is defined as oblong hole. Thus, the ring member 70 connects the rotary plate 40 and the holding member 50, thereby connecting the rotary plate 40 and the holding member 50 to be slidable. Therefore, the slide of the display portion 2 and the arm portion 3 is ensured as described later.

Referring to FIG. 1, one end 62 of the spring 60 is latched with latched portions 562 of the holding member 50, and the other end of the spring 60 is lathed with the ring member 70.

The spring 60 urges the ring member 70 toward one end of the opening 52 as illustrated in FIG. 1. Therefore, the rotary plate 40 is held at one end of the opening 52, the slid of the rotary plate 40 and the holding member 50 is performed against an urging force of the spring 60. In addition, the holding member 50 is provided with a standing portion 56 and a projective portion 561. The standing portion 56 is in contact with a spiral portion of the spring 60 to fix the spring 60 with the holding member 50. The projective portion 561 is in contact with one end side of the spring 60.

FIGS. 3A and 3B are explanatory views of the FFC 8, FIG. 3A is a perspective view of the FFC 8 installed in the mobile phone, and FIG. 3B is a front view of the FFC 8 in an unfolded state. As illustrated in FIG. 3A, the FFC 8 includes a first extending portion 82, a second extending portion 83, and a bent portion 85 located between the first and second extending portions 82 and 83. The first and second extending portions 82 and 83, and the bent portion 85 are continuously formed. The first and second extending portions 82 and 83 each has a surface extending along a given plane. The bent portion 85 has a bent surface 851 which is bent to surround an axis A perpendicular to the given plane. The bent portion 85 is accommodated within the openings 41, 72 and 32. As will be described later, the bent portion 85 functions to permit the first and second extending portions 82 and 83 to rotate about the axis A.

In addition, the axis A corresponds to a normal line of a given plane. The axis A passes through the centers of the openings 42 and 72. The axis A corresponds to a rotational axis of the display portion 2 and the arm portion 3.

The second extending portion 83 has an inflectional portion 831 which is inflected by approximately 180 degrees angle to overlap itself at its partway. As will be described in later, the position of the inflectional portion 831 moves in the length direction of the second extending portion 83, whereby a portion other than the end portion of the second extending portion 83 is made slidable relative to the end portion thereof in the length direction of the second extending portion 83.

As illustrated in FIG. 3B, the FFC 8 has a substantially Z shape in an unfolded state. The first extending portion 82 and the bent portion 85 are substantially identical in width, and the second extending portion 83 is wider than the first extending portion 82 and the bent portion 85. Moreover, in FIG. 3B, the bent portion 85 is illustrated by hatching, and the position of the inflectional portion 831 in the initial state of the mobile phone is illustrated by a broken line.

Figure 4A:
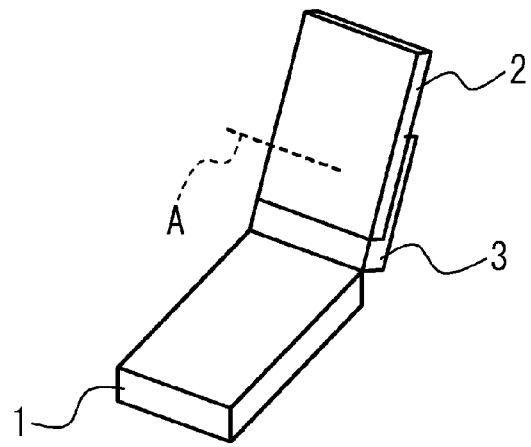
FIGS. 4A to 4C are explanatory views of the rotation of a display portion and an arm portion of the mobile phone according to the first embodiment.
Figure 4B:
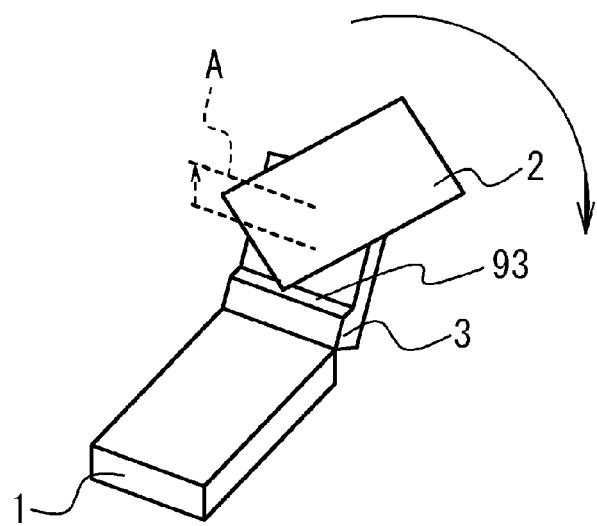
Figure 4C:
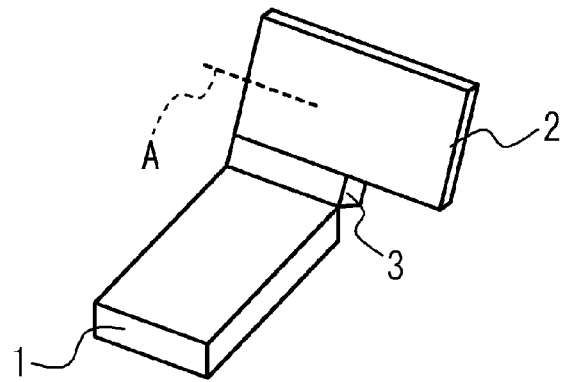

Next, a description will be given of the rotation of the display portion 2 and the arm portion 3 of the mobile phone according to the first embodiment. FIGS. 4A to 4C are explanatory views of the rotation of the display portion 2 and the arm portion 3 of the mobile phone according to the first embodiment. Additionally, FIGS. 4A to 4C simply illustrate the mobile phone. FIG. 4A illustrates the initial state in which the display portion 2 and the arm portion 3 are opened from the main portion 1. Referring to FIG. 4B, the display portion 2 is rotatable clockwise relative to the arm portion 3 from the state illustrated in FIG. 4A. When the display portion 2 rotates clockwise, the display portion 2 slides upwardly relative to the display portion 2. That is, the axis A representing the rotational axis moves upwardly. This is because an edge of the display portion 2 having an rectangular shape and a supporting wall 93 of the arm portion 3 supporting the display portion 2 are abutted by the rotation of the display portion 2, so that a distance from the supporting wall 93 of the arm portion 3 to the rotational axis of the display portion 2 is changed. At this time, the opening 42 slides from one end to the other end of the opening 52 in its length direction. After the display portion 2 rotates clockwise by 90 degrees, the axis A returns to a position substantially identical with a position before the rotation. Further, the supporting wall 93 abuts the display portion 2 in the initial state and in the state in which the display portion 2 rotates clockwise by 90 degrees from the initial state.

Figure 5:
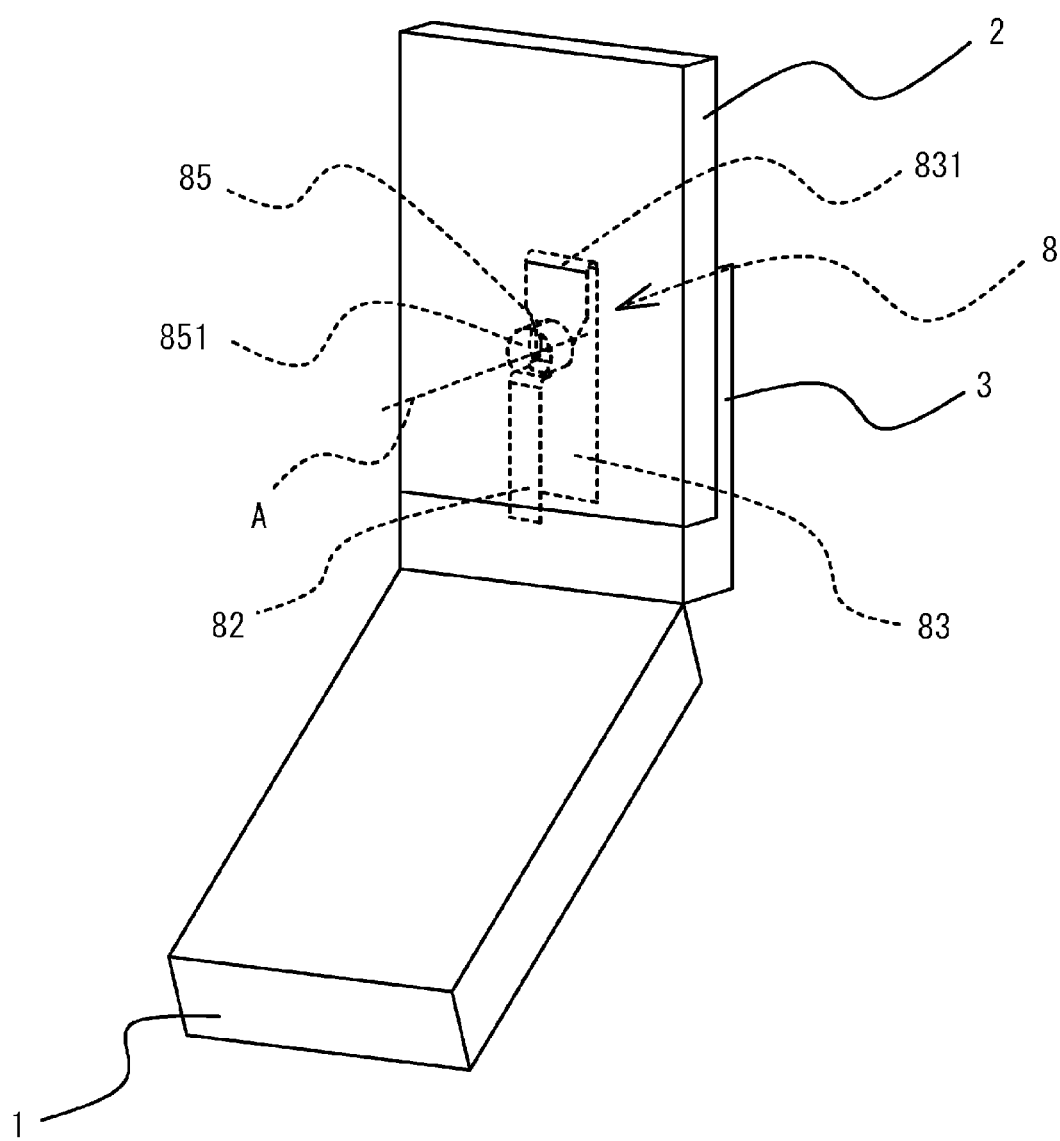
FIG. 5 is an explanatory view of a state of the FFC.

Next, a description will be given of states of the FFC 8 built in the mobile phone. FIG. 5 is an explanatory view of a state of the FFC 8. FIG. 5 illustrates the mobile phone in the opened state. Additionally, FIG. 5 simply illustrates the mobile phone to facilitate understanding of the state of the FFC 8. In the state in which the display portion 2 and the arm portion 3 are not rotated, the first and second extending portions 82 and 83 are arranged to extend in the identical direction.

Next, a description will be given of the states of the FFC 8 in association with the rotation of the display portion 2 and the arm portion 3. FIGS. 6A to 6C are explanatory views of the state of the FFC 8 in association with the rotation of the display portion 2 and the arm portion 3. FIG. 6A illustrates the mobile phone and the FFC 8 in the initial state. FIG. 6B illustrate the state in which the display portion 2 rotate clockwise from the initial state. When the display portion 2 rotates clockwise, the first extending portion 82 rotates counter-clockwise about the axis A by approximately 90 degrees. At this time, the first extending portion 82 rotates so that the distance form the axis A to the bent surface 851 is larger than the initial state.

Further, when the display portion 2 rotates counterclockwise from the initial state, the first extending portion 82 rotates clockwise about the axis A by approximately 90 degrees, as illustrated in FIG. 6C. At this time, the first extending portion 82 rotates so that the distance form the axis A to the bent surface 851 is shorter than the initial state.

In this manner, since the bent portion 85 is provided between the first and second extending portions 82 and 83, the first and second extending portions 82 and 83 are permitted to relatively rotate about the axis A. The diameter of the bent portion 85 become larger or smaller with the axis A centered, thereby permitting the first and second extending portions 82 and 83 to relatively rotate. This maintains the relative rotation of the display portion 2 and the arm portion 3. Further, the load applied on the FFC 8 is reduced, and electrical signal lines within the FFC 8 are prevented from being broken.

Furthermore, the display portion 2 slides upwardly relative to the arm portion 3 and the axis A moves upwardly when the display portion 2 rotates, as illustrated in FIGS. 4A to 4C. In order to permit the slide, the FFC 8 has the inflectional portion 831. The position of the inflectional portion 831 moves, thereby permitting the first extending portion 82 and the bent portion 85 to move relative to the second extending portion 83.

Further, the width of the bent portion 85 is narrower than that of the second extending portion 83, as illustrated in FIG. 3B. Therefore, the thickness of the mobile phone is reduced in the axis A direction. Moreover, the second extending portion 83 is housed within the openings 32, 42, 72, and 92, whereby the thickness of the mobile phone is prevented from being larger.

Herein, a description will be given of an electrical connection of the display portion and the arm portion in a mobile phone having a different structure from the mobile phone according to the present embodiment. In a case where the electrical connection of the display portion 2 and the arm portion 3 is ensured by plural cables instead of the FFC 8, the plural cables have to be bundled and routed through the openings 32, 42, 52, 72 and 92. Thus, the assembling workability is degraded. This is one of the reasons for increasing the manufacturing cost. However, as the mobile phone according to the first embodiment, the FFC 8 is employed, thereby eliminating the necessary of bundling the plural cables. Thus, the assembling workability is improved. Accordingly, the manufacturing cost is reduced.

Second Embodiment

Figure 7:
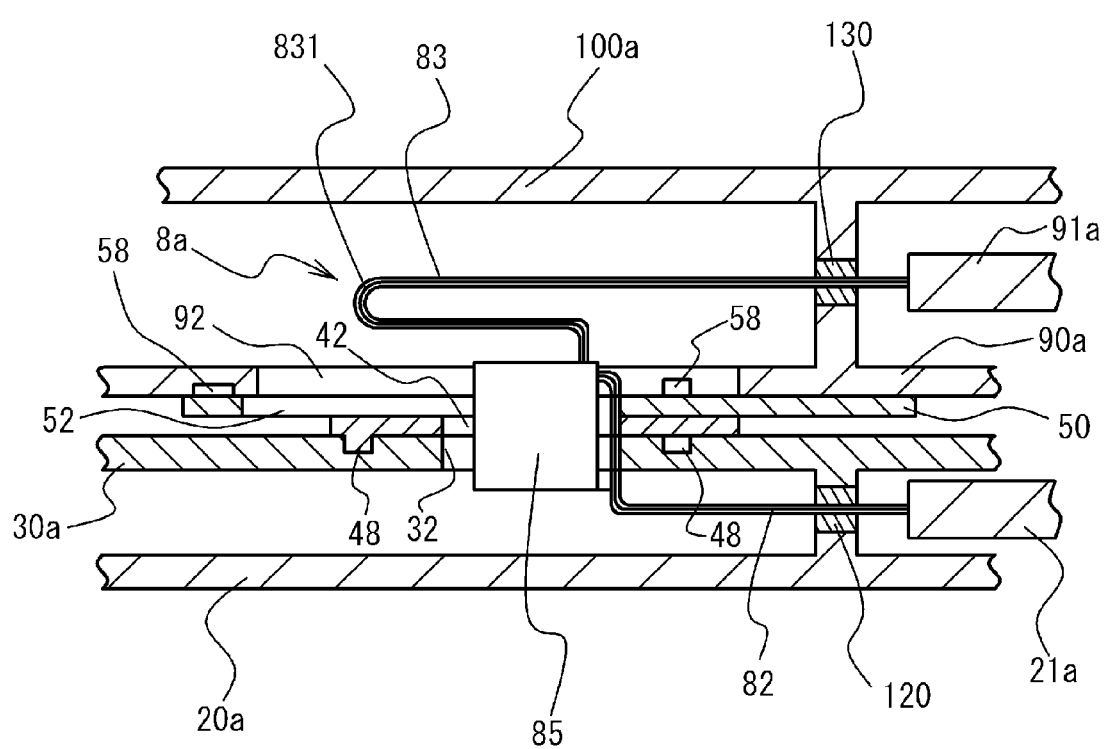
FIG. 7 is a cross-sectional view of a mobile phone according to a second embodiment.

Next, a description will be given of a mobile phone according to the second embodiment. Additionally, the same components as the first embodiment have the same reference numerals in order to avoid a duplicated explanation. FIG. 7 is a cross-sectional view of a mobile phone according to the second embodiment. Additionally, the ring member 70 is omitted in FIG. 7.

In a FFC 8a, two flat cables overlap with each other in its thickness direction. The two flat cables are partially bonded with a double-faced tape. A substrate 21s is connected to an end portion of the first extending portion 82. A substrate 91a is connected to an end portion of the second extending portion 83. Further, the first extending portion 82 is integrated with a gasket (sealing member) 120. The second extending portion 83 is integrated with a gasket (sealing member) 130. The gasket 120 is arranged between a front case 20a and a rear case 30a, and the gasket 130 is arranged between a front case 90a and a rear case 100a. In the two flat cables, peripheral portions where the two flat cables are integrated with the gaskets 120 and 130 are bonded with the double-faced tape.

Figure 8A:
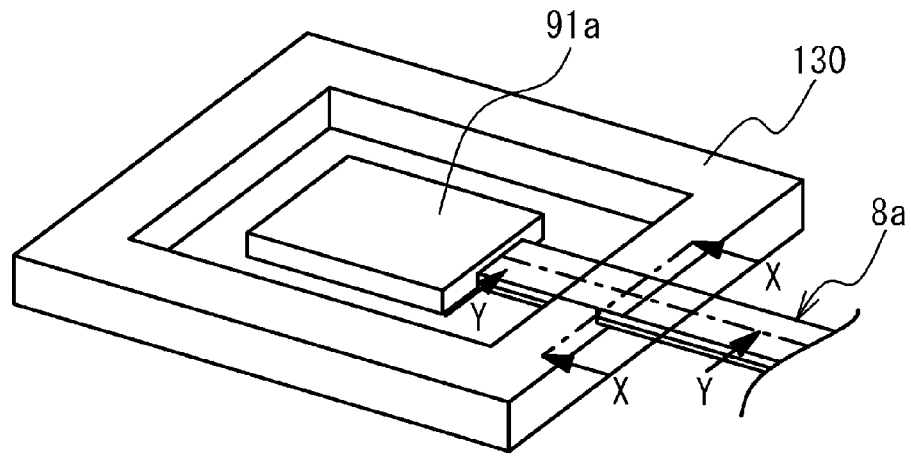
FIGS. 8A to 8C are explanatory views of a gasket.
Figure 8B:
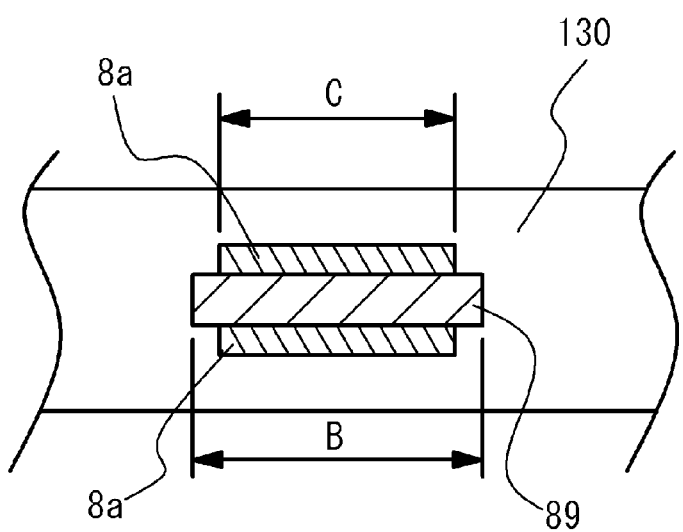
Figure 8C:
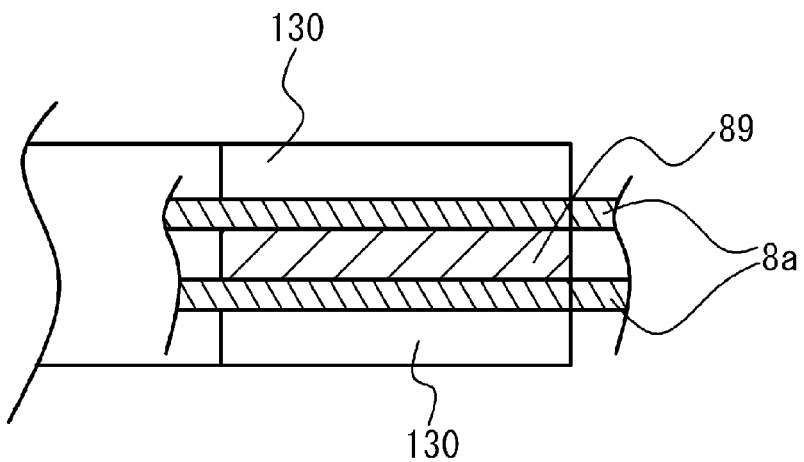

FIGS. 8A to 8C are explanatory views of the gasket 130. FIG. 8A illustrates the shape of the gasket 130. The gasket 130 is formed to surround the substrate 91a. Further, the gasket 130 is arranged between the rear case 100a and the front case 90a. Therefore, the infiltration of water into the substrate 91a is prevented.

FIG. 8B is a cross-sectional view taken along X-X line in FIG. 8A. The width B of the double-faced tape 89 is larger than the width C of the FFC 8a. FIG. 8C is a cross-sectional view taken along Y-Y line in FIG. 8A. In the two flat cables, peripheral portions where the two flat cables are integrated with the gasket 130 are bonded by the double-faced tape 89. Therefore, the peripheral portions, which are bonded with the double-faced tape 89, are hermetically sealed by the integral formation with the gasket 130 and with the material thereof. In this manner, by such a simple technique of using the double-faced tape 89, the waterproof property is improved in the mobile phone according to the second embodiment.

In addition, the two flat cables that overlaps with each other has been exemplified, however, the present invention is not limited to the number of the flat cables. Furthermore, plural flat cables may be bonded by with adhesive material instead of a double-faced tape.

Third Embodiment

Figure 9A:
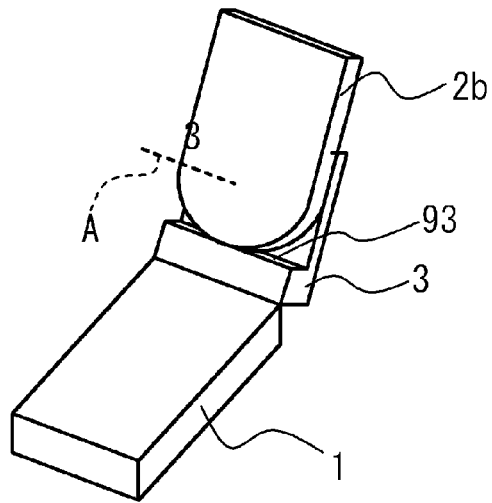
FIGS. 9A to 9C are explanatory views of the rotation of a display portion and the arm portion of a mobile phone according to a third embodiment.
Figure 9B:
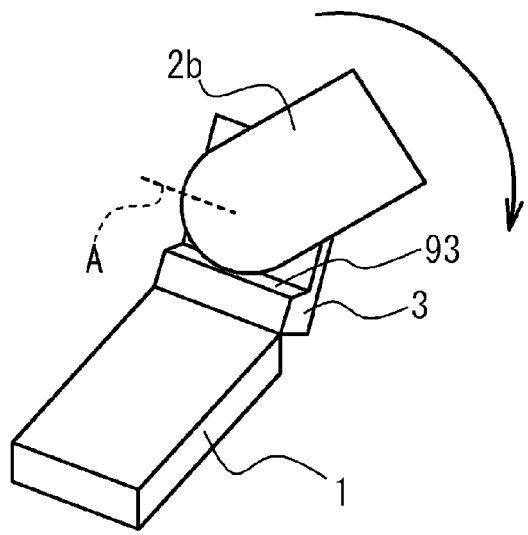
Figure 9C:
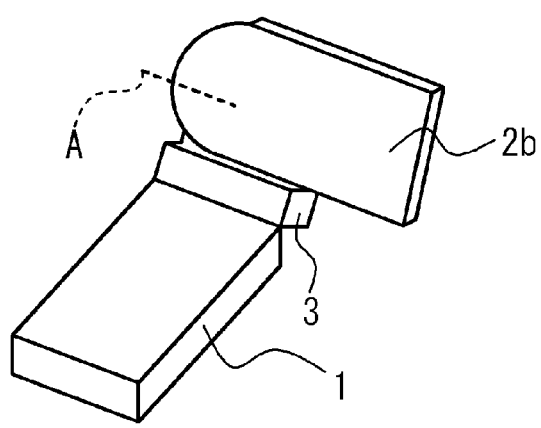

Next, a description will be given of a mobile phone according to a third embodiment. FIGS. 9A to 9C are explanatory views of the rotation of a display portion 2b and the arm portion 3 of the mobile phone according to the third embodiment. In the mobile phone according to the third embodiment, a low end portion of the display portion 2b has a semicircular shape. Therefore, when the display portion 2b rotates relative to the arm portion 3, the position of the axis A is not substantially changed. That is, the display portion 2b is not slidably connected to the arm portion 3.

Figure 10A:
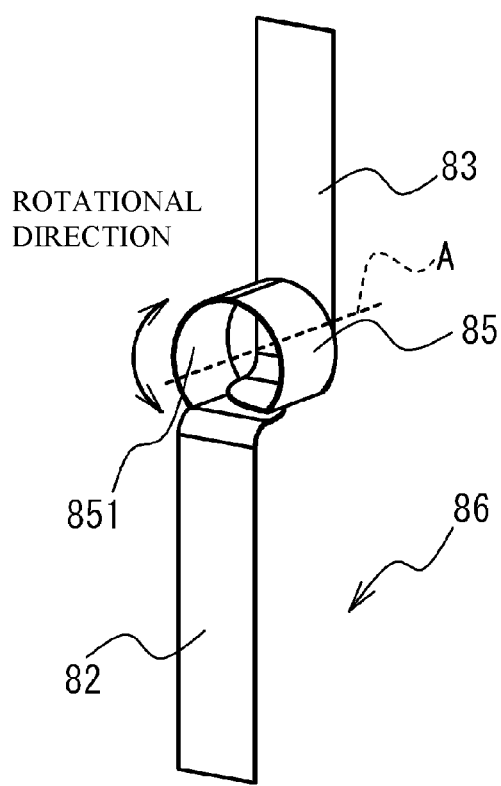
FIGS. 10A and 10B are explanatory views of a FFC employed in the mobile phone according to the third embodiment.
Figure 10B:
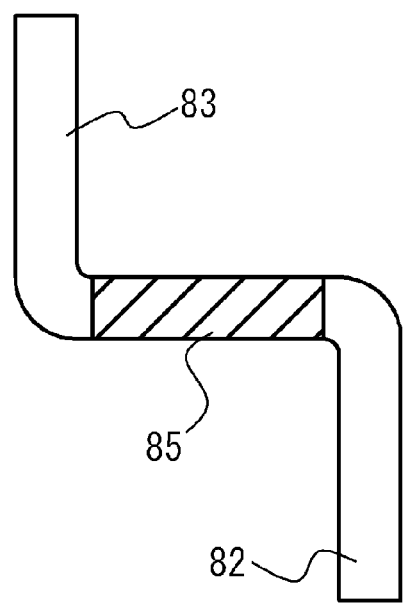

FIGS. 10A and 10B are explanatory views of a FFC 8b employed in the mobile phone according to the third embodiment. FIG. 10A illustrates a perspective view of the FFC 8b, and FIG. 10B illustrates the FFC 8*b* in the unfolded state. As illustrated in FIGS. 10A and 10B, the second extending portion 83 does not have an inflectional portion. This is because the display portion 2*b* rotates without sliding relative to the arm portion 3, referring to FIG. 9. Accordingly, the FFC 8*b* may be employed in the mobile phone that dose not have a sliding mechanism.

Fourth Embodiment

Next, a description will be given of the mobile phone according to the fourth embodiment. FIGS. 11A to 11D are explanatory views of the rotation of a display portion and an arm portion of the mobile phone according to the fourth embodiment. When a display portion 2*c* rotates clockwise from an initial state illustrated in FIG. 11A, the axis A moves upwardly as illustrated in FIG. 11B. When the display portion 2*c* further rotates by 90 degrees, the axis A illustrated in FIG. 11C returns to an initial position. Then, by use of a connecting mechanism for connecting the display portion 2*c* and a arm portion 3*c* to be rotatable and slidable, the display portion 2*c* is positioned at a center position of the arm portion 3*c*, as illustrated in FIG. 11D.

Figures 12A, 12B:
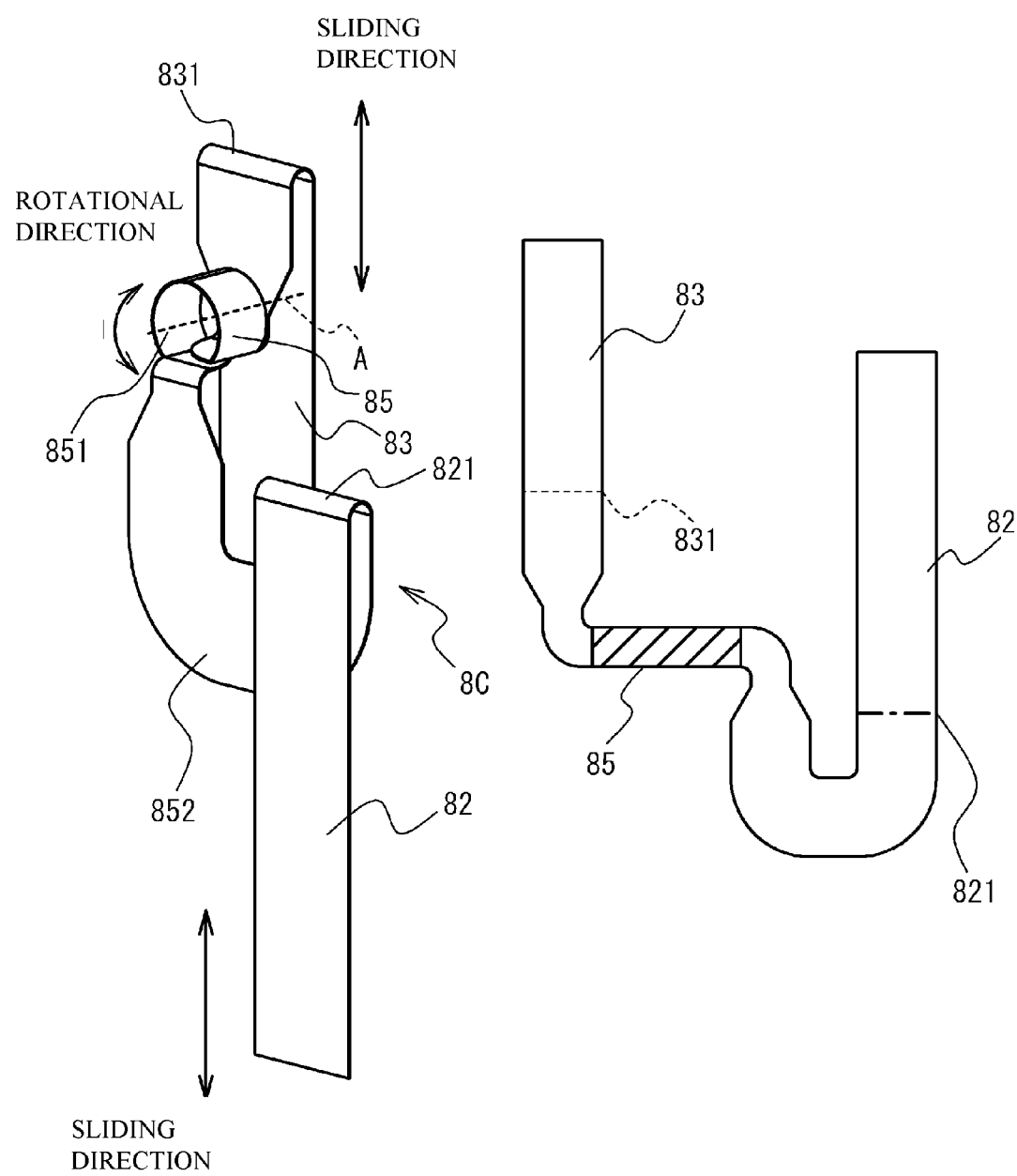
FIGS. 12A and 12B are explanatory view of a FFC employed in a mobile phone according to the fourth embodiment.

FIGS. 12A and 12B are explanatory view of a FFC 8*c* employed in the mobile phone according to the fourth embodiment. FIG. 12A illustrates a perspective view of the FFC 8*c*. FIG. 12B illustrates the FFC 8*c* in the unfolded state. In the FFC 8*c*, the first and second extending portions 82 and 83 are respectively provided with inflectional portions 821 and 831. Further, in the first extending portion 82, a U-shaped portion 852 is provided between the inflectional portion 821 and the bent portion 85. The U-shaped portion 852 is curved by approximately 90 degrees.

By moving the inflectional portion 821, the second extending portion 83 and the bent portion 85 are moved relative to the first extending portion 82 in the length direction of the first extending portion 82. Therefore, the display portion 2*c* is allowed to slide from the state illustrated in FIG. 11C to the state illustrated in FIG. 11D. Consequently, the FFC 8*c* is employed in the mobile phone according to the fourth embodiment in which a sliding range is larger, thereby ensuring the slide.

Further, referring to FIG. 12B, the first and second extending portions 82 and 83 have certain widths, and the width of the bent portion 85 is narrower than the widths of the first and second extending portions 82 and 83. This is because the wide bent portion 85 causes the thickness of the mobile phone to be increased in the direction of the axis A.

Fifth Embodiment

Next, a description will be given of a mobile phone according to a fifth embodiment. FIGS. 13A to 13D are explanatory views of the mobile phone according to the fifth embodiment. The mobile phone according to the fifth embodiment includes a main portion 1*d* and a display portion 2*d*. The main portion 1*d* is provided with a display, not illustrated, at its front surface. The main portion 1*d* is provided with an operational portion, not illustrated, at its opposite surface opposite to the display portion 2*d*.

FIG. 13A illustrates an initial state of the mobile phone according to the fifth embodiment. In the initial state, the main portion 1*d* and the display portion 2*d* are opposed to each other. The display portion 2*d* slides relative to the main portion 1*d* in a given direction from the initial state, then the operational portion, not illustrated, is exposed from the opposite surface of the main portion 1*d*, as illustrated in FIG. 13B. The display portion 2*d* rotates clockwise after sliding, then a low end portion of the display portion 2*d* abuts the supporting wall 93 of the main portion 1*d* as illustrated in FIG. 13C, and the axis A moves upwardly. After the rotation, the display portion 2*d* slides to a substantially central portion of the main portion 1*d*, as illustrated in FIG. 13D. In such a mobile phone in which the sliding range is larger, the FFC 8*c*, which is employed in the mobile phone according to the fourth embodiment, can be employed.

The present invention may be employed in an electronic apparatus, such as a PDA or a notebook computer, in which two electronic unites are opposed to each other and are connected to be relatively rotatable.

All examples and conditional language recited herein are intended for pedagogical purposes to aid the reader in understanding the invention and the concepts contributed by the inventor to furthering the art, and are to be constructed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. An electronic apparatus comprising:
   first and second electronic units opposed to each other and connected to relatively rotate in a given plane; and
   a flat cable electrically connecting the first and second electronic units,
   the flat cable comprising:
      first and second extending portions respectively connected to the first and second electronic units sides, and each having a surface extending along the given plane; and
      a bent portion having a bent surface located between the first and second extending portions, and the bent surface bent to surround a normal line perpendicular to the given plane,
   wherein the first and second electronic units are opposite to each other and slidably connected, and
   at least one of the first and second extending portions has an inflectional portion to overlap each other.

2. The electronic apparatus of claim 1, wherein the bent portion narrower than the inflectional portion.

3. The electronic apparatus of claim 1, further comprising a connecting mechanism connecting the first and second electronic units for rotation and having an opening,
   the flat cable penetrating through the opening.

4. The electronic apparatus of claim 3, wherein the bent portion is accommodated in the opening.

5. The electronic apparatus of claim 3, wherein the connecting mechanism comprises:
   first and second fixing members respectively fixed to the first and second electronic units sides; and
   a connecting member interconnecting the first and second fixing members for rotation,
   the first and second fixing member each having an opening,
   the connecting member engaged with the opening of the first fixing member and the opening of the second fixing member, and having an opening located at a center of the connecting member.

6. The electronic apparatus of claim 5, wherein at least one of the openings of the first and second fixing members is oblong to allow the connecting member to slide.

7. The electronic apparatus of claim 1, wherein the flat cable comprises a plurality of flat cables overlapping with each other in thickness and being at least partially bonded.

8. The electronic apparatus of claim 1, wherein the flat cable is integrally formed with a sealing member of at least one of the first and second electronic units.

9. A flat cable comprising:
 first and second extending portions each having a surface extending along the given plane; and
 a bent portion having a bent surface located between the first and second extending portions, and the bent surface bent to surround a normal line perpendicular to the given plane,
 wherein at least one of the first and second extending portions has an inflectional portion to overlap each other.

\* \* \* \* \*